United States Patent
Kawashima

(10) Patent No.: US 11,499,571 B2
(45) Date of Patent: Nov. 15, 2022

(54) VACUUM PUMP AND VACUUM-PUMP DAMPER

(71) Applicant: Edwards Japan Limited, Chiba (JP)

(72) Inventor: Toshiaki Kawashima, Chiba (JP)

(73) Assignee: Edwards Japan Limited, Chiba (JP)

( * ) Notice: Subject to any disclaimer, the term of this patent is extended or adjusted under 35 U.S.C. 154(b) by 0 days.

(21) Appl. No.: 16/980,999

(22) PCT Filed: Mar. 13, 2019

(86) PCT No.: PCT/JP2019/010417
§ 371 (c)(1),
(2) Date: Sep. 15, 2020

(87) PCT Pub. No.: WO2019/181705
PCT Pub. Date: Sep. 26, 2019

(65) Prior Publication Data
US 2021/0108654 A1    Apr. 15, 2021

(30) Foreign Application Priority Data
Mar. 20, 2018    (JP) .............................. JP2018-053269

(51) Int. Cl.
*F04D 29/66*      (2006.01)
*F04D 19/04*      (2006.01)
(Continued)

(52) U.S. Cl.
CPC ........... *F04D 29/669* (2013.01); *F04D 19/04* (2013.01); *F04D 19/042* (2013.01);
(Continued)

(58) Field of Classification Search
CPC ...... F04D 19/042; F04D 19/04; F04D 29/522; F04D 29/668; F04D 29/086;
(Continued)

(56) References Cited

U.S. PATENT DOCUMENTS

| 5,671,956 A | 9/1997 | Crawford |
| 2007/0104598 A1 | 5/2007 | Varennes et al. |

(Continued)

FOREIGN PATENT DOCUMENTS

| DE | 102004044775 A1 | 4/2006 |
| EP | 2918843 A1 | 9/2015 |

(Continued)

OTHER PUBLICATIONS

PCT International Search Report dated Jun. 11, 2019 for corresponding PCT Application No. PCT/JP2019/010417.
(Continued)

*Primary Examiner* — Christopher Verdier
*Assistant Examiner* — Andrew J Marien
(74) *Attorney, Agent, or Firm* — Theodore M. Magee; Westman, Champlin & Koehler, P.A.

(57) ABSTRACT

A vacuum pump and a damper for the vacuum pump are provided so as to increase vibration isolation in a twisting direction with a simple structure and prevent rupture of an O-ring and an elastic member by regulating a misalignment of flanges facing each other. Provided are a first flange and a second flange, each having a central opening, the flanges being shaped like rings opposed to each other; an O-ring and an intermediate ring that are disposed between the first flange and the second flange; O-rings disposed between the first flange and the intermediate flange and between the intermediate ring and the second flange; a plurality of elastic members that are disposed between the first flange and the second flange and are spread in the circumferential direction of central openings; and airtightness keeping means including positioning pins inserted into positioning holes sequentially provided on the first flange, the intermediate ring, and the second flange.

12 Claims, 15 Drawing Sheets

(51) Int. Cl.
  *F04D 29/08* (2006.01)
  *F04D 29/52* (2006.01)
  *F16F 15/08* (2006.01)
  *F16F 1/373* (2006.01)

(52) U.S. Cl.
  CPC ......... *F04D 29/086* (2013.01); *F04D 29/522* (2013.01); *F04D 29/668* (2013.01); *F16F 1/3732* (2013.01); *F16F 15/08* (2013.01); *F05D 2260/31* (2013.01); *F05D 2300/431* (2013.01); *F16F 2224/025* (2013.01)

(58) Field of Classification Search
  CPC ....... F04D 29/669; F16F 15/08; F16F 1/3732; F16F 2224/025; F16F 2300/431; F05D 2260/03; F05D 2300/4431; F05D 60/437
  See application file for complete search history.

(56) References Cited

U.S. PATENT DOCUMENTS

2009/0081040 A1* 3/2009 Ueno ................... F16C 19/548
  415/229

2011/0254263 A1* 10/2011 Quartarone ........... F16F 1/3732
  285/49
2012/0128484 A1* 5/2012 Hamochi .............. F04D 29/668
  415/220
2019/0285209 A1* 9/2019 Smith ................... F04D 19/042

FOREIGN PATENT DOCUMENTS

| | | |
|---|---|---|
| GB | 2552324 A | 1/2018 |
| JP | S5023368 Y1 | 7/1975 |
| JP | 2003003988 A | 1/2003 |
| JP | 2010169102 A | 8/2010 |
| JP | 2011226466 A | 11/2011 |

OTHER PUBLICATIONS

PCT International Written Opinion dated Jun. 11, 2019 for corresponding PCT Application No. PCT/JP2019/010417.
European Communication dated Nov. 2, 2021 and Supplementary Search Report dated Oct. 20, 2021, 9 pages.

* cited by examiner

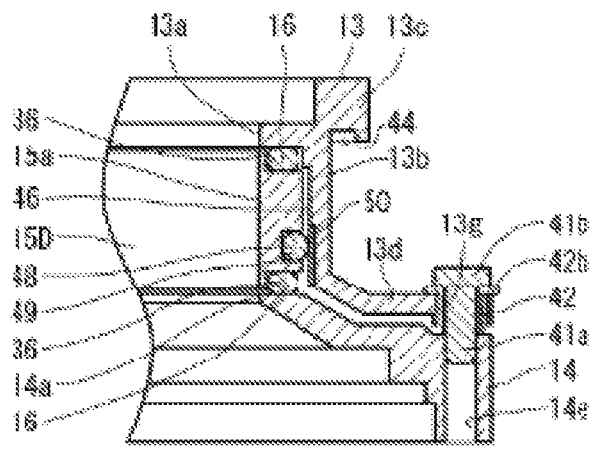

VACUUM PUMP AND VACUUM-PUMP DAMPER

CROSS-REFERENCE OF RELATED APPLICATION

This application is a Section 371 National Stage Application of International Application No. PCT/JP2019/010417, filed Mar. 13, 2019, which is incorporated by reference in its entirety and published as WO 2019/181705 A1 on Sep. 26, 2019 and which claims priority of Japanese Application No. 2018-053269, filed Mar. 20, 2018.

BACKGROUND

The present invention relates to a vacuum pump and a vacuum-pump damper and particularly relates to a vacuum pump that is connected to instruments such as an electron microscope and containers and sucks gas in the instruments and a vacuum-pump damper.

Conventionally, a vacuum pump used for exhausting gas in instruments such as an electron microscope and containers is provided with inlet port part on one end of a casing, which accommodates an exhaust function part, and an outlet port part on the other end of the casing, the inlet port part including an inlet port. The inlet port part is connected to, for example, an external device via a pipe or the like, so that external gas is introduced into the casing from the inlet port art.

As the exhaust function unit stored in the casing, for example, a rotor portion and a stator portion are disposed. The outer surface of one of the rotor portion and the stator portion is opposed to the inner surface of the other and forms a gas transfer portion for transferring gas between the rotor portion and the stator portion. Furthermore, the rotor portion is rotated by driving means such as a motor and transfers the gas of the gas transfer portion to an exhaust side, thereby sucking external gas.

In a turbo molecular pump that is a kind of vacuum pump, for example, a stator portion has stator blades extending toward a rotor portion. The rotor portion has rotor blades extending between the stator blades. The rotor blades are rotated to hit and transfer gas molecules. Moreover, in a screw groove pump, screw grooves are formed on one of the opposed surfaces of a rotor portion and a stator portion. By rotating a rotor, gas is transferred using the viscosity of gas. These pumps may be combined as turbo molecular pumps.

In the vacuum pump, a gas suction force is obtained by rotating the rotor portion and some vibrations are created according to the rotation. The vibrations are propagated from the casing to an external device through an inlet port part or a pipe. The functions and durability of the external device may be adversely affected by vibrations. For example, a microscope image in an electron microscope is seriously affected by small vibrations. Various measures are proposed to prevent such vibrations from propagating from vacuum pumps to external devices or the like. For example, measures in Japanese Patent Application Publication No. 2003-3988 and Japanese Patent No. 6133919 are known.

In the known technique of Japanese Patent Application Publication No. 2003-3988, a casing in which a stator portion, stator blades, a rotor portion, and rotor blades are stored as an exhaust function unit is connected to an inlet port part including an inlet port for sucking gas from the outside. The casing and the inlet port part are connected while being sealed with an elastic member formed of a stainless (SUS) bellows. Between the casing and the inlet port part, a movement regulating member is provided to regulate a clearance changed by relative movements between the casing and the inlet port part. In this technique, the elastic member can keep a proper elastic force by using the movement regulating member and always obtain satisfactory vibration reduction. Furthermore, the elastic member can prevent vibrations from propagating through external devices so as to deteriorate the functions and durability. Moreover, this technique can prevent plastic deformation or damage on the elastic member and a seal member and prevent a vacuum pump from falling into disorder in an accident.

In the known technique of Japanese Patent. No. 6133919, an O-ring and a fixed element are disposed between a first flange connected to a vacuum pump and a second flange connected to a receiver. In an evacuated operational status, the flanges are mechanically and/or electrically separated from each other, whereas in an assembly status without evacuation, an auxiliary load is applied to ensure evacuation and airtightness for the O-ring.

The discussion above is merely provided for general background information and is not intended to be used as an aid in determining the scope of the claimed subject matter. The claimed subject matter is not limited to implementations that solve any or all disadvantages noted in the background.

SUMMARY

In the known technique of Japanese Patent Application Publication No. 2003-3988, the elastic member formed of a stainless (SUS) bellows is used as means for reducing vibrations between the casing and inlet port part. Unfortunately, the stainless bellows has high stiffness in a twisting direction and thus results in insufficient isolation from vibration in the twisting direction. Moreover, a stainless (SUS) bellows is expensive and leads to a high manufacturing cost.

In the known technique of Japanese Patent No. 6133919, all atmospheric pressures from the outside are held by the O-ring when a vacuum chamber is evacuated. Thus, a standard O-ring may be excessively crushed and an expensive special O-ring may be necessary instead, thereby increasing the manufacturing cost. Moreover, in order to regulate a misalignment of flange surfaces facing each other with the O-ring interposed therebetween, a screw for fixing the flanges and a separating element for indirect contact between the flanges are necessary. This may result in a complicated structure and higher manufacturing cost.

The technical problems should be solved to provide a vacuum pump and a vacuum-pump damper which can increase vibration isolation in a twisting direction with a simple structure and prevent rupture and damage of an O-ring and an elastic member by regulating a misalignment of flanges facing each other. An object of the present invention is to solve the problems.

The present invention is proposed to attain the object. An invention according to claim 1 provides a vacuum pump including: a first flange and a second flange, each having a central opening, the flanges being ring-shaped and disposed oppositely to each other; at least one intermediate ring each of the at least one intermediate ring corresponding to the opening of the first flange and the opening of the second flange, having a central opening, and being disposed between the first flange and the second flange; O-rings, the O-rings being respectively disposed between the first flange and the at least one intermediate ring and between the at least one intermediate ring and the second flange; a plurality of elastic members, each of the plurality of elastic member being disposed such that the plurality of elastic member are circumferentially spread both between the first flange and the at least one intermediate ring and between the at least one intermediate ring and the second flange; and airtightness keeping means, the airtightness keeping means including positioning members, the positioning members being disposed so as to sequentially penetrate through positioning holes provided on the first flange, the at least one intermediate ring, and the second flange.

With this configuration, when the vacuum chamber is evacuated, the O-rings and the elastic members are elastically compressed by atmospheric pressures so as to reduce a clearance between the first flange and the second flange, the second flange or the first flange and the positioning members are not in contact with each other, and the first flange and the second flange are connected to each other only via the O-rings, the elastic members, and the at least one intermediate ring. In this state, a spring constant in a twisting direction is smaller than that of a damper using a bellows, improving the effect of vibration isolation. Moreover, the first flange and the second flange are electrically/mechanically insulated from each other, preventing undesirable electrical noise in the vacuum pump from propagating through the vacuum chamber via the flanges. Furthermore, the elastic members are spread in the circumferential direction of the central opening of the first flange and in the circumferential direction of the central opening of the second flange. Thus, a spring constant in a lateral direction can be set smaller than that of a ring-shaped elastic member surrounding the central opening of the flange, improving the capability of vibration isolation in the lateral direction. The O-rings and the elastic members are disposed in at least one stage between the first flange and the intermediate ring and at least one stage between the second flange and the intermediate ring. In other words, the O-rings are disposed in two stages and the elastic members are disposed in two stages in total. Specifically, the intermediate ring is provided between the first flange and the second flange so as to constitute a two-degree-of-freedom system including the O-rings in two stages and the elastic members in two stages. This can remarkably improve damping of high-frequency oscillations. High-frequency oscillations is further damped when the number of stages of the intermediate ring disposed between the first flange and the second flange and O-rings are provided at respective clearances.

In the configuration according to claim 1, an invention according to claim 2 provides a vacuum pump in which the elastic member is substantially cylindrical or prismatic.

With this configuration, the substantially cylindrical or prismatic elastic members are disposed like columns around the O-rings, thereby easily distributing loads so as to apply proper weights to the O-rings when the vacuum chamber is evacuated. Moreover, the capability of vibration isolation improves in a twisting direction.

In the configuration according to claim 1 or 2, an invention according to claim 3 provides a vacuum pump in which the O-ring is a composite member formed by coating the outer surface of a core made of silicon rubber with fluorocarbon rubber.

With this configuration, the O-ring formed by coating the outer surface of the core made of silicon rubber, which is relatively inexpensive and highly capable of vibration isolation, with fluorocarbon rubber that provides excellent vacuum sealing.

In the configuration according to claim 1, 2, or 3, an invention according to claim 4 provides a vacuum pump in which the first flange and the second flange have recesses for positioning the corresponding O-rings and elastic members at places in which the O-rings and the elastic members are disposed.

With this configuration, the first flange and the second flange have recesses for positioning the corresponding O-rings and elastic members and thus the O-rings and the elastic members positioned in the corresponding recesses can prevent a lateral misalignment of the flanges. This eliminates the need for a member for preventing a lateral misalignment of the flanges, thereby suppressing the manufacturing cost.

In the configuration according to claim 1, 2, 3, or 4, an invention according to claim 5 provides a vacuum pump in which from among the positioning recess for positioning the O-ring provided between the first flange and the at least one intermediate ring and the positioning recess for positioning the O-ring provided between the second flange and the at least one intermediate ring, one of the positioning recesses positions the O-ring such that a spring constant in an axial direction is smaller than a spring constant in a radial direction, and the other positioning recess positions the O-ring such that a spring constant in the radial direction is smaller than a spring constant in the axial direction.

With this configuration, vibration isolation improves in the axial direction on O-ring placed in the positioning recess so as to reduce the spring constant in the axial direction, whereas vibration isolation improves in the radial direction on the O-ring placed in the positioning recess so as to reduce the spring constant in the radial direction. This achieves effective vibration isolation in the axial direction and the width direction.

In the configuration according to claim 1, 2, 3, 4, or 5, an invention according to claim 6 provides a vacuum pump in which one of the first flange and the second flange has mounting holes for mounting fixing screws for fixation to a vacuum chamber, and the at least one intermediate ring opposed to the mounting holes has notches for releasing the heads of the fixing screws when the fixing screws are mounted, the notches being provided at a point corresponding to the mounting holes.

With this configuration, when the first flange or the second flange is attached to the vacuum chamber or the vacuum pump with the fixing screws, the intermediate ring has the notches for releasing the heads of the fixing screws, so that the intermediate ring can be smoothly attached without hitting the heads of the fixing screws and the assembly operation improves.

In the configuration according to claim 1, 2, 3, 4, 5, or 6, an invention according to claim 7 provides a vacuum pump in which the first flange includes: an annular part having an inner surface disposed over the outer surface of the at least one intermediate ring; and a flange part on which the elastic members and the positioning members are disposed, the flange part extending outward from one end face of the annular part.

With this configuration, the annular part extended downward from the undersurface of the first flange creates a large space between the first flange and the second flange. When the first flange is attached to the vacuum chamber with the fixing screws, the space is used as a mounting space for the fixing screws, achieving a simple operation.

In the configuration according to claim 1, 2, 3, 4, 5, 6, or 7, an invention according to claim 8 provides a vacuum pump in which the at least one intermediate ring includes multiple intermediate rings stacked in the axial direction of the first flange, the first flange partially includes an annular part having an inner surface disposed over outer surfaces of the intermediate rings, and the vacuum pump further includes a second O-ring between the outer surface of the intermediate ring and the inner surface of the annular part.

With this configuration, when the vacuum chamber is evacuated, the O-rings and the elastic members are elastically compressed by atmospheric pressures so as to reduce a clearance between the first flange and the second flange, the second flange or the first flange and the fixing members are not in contact with each other, and the first flange and the second flange are connected to each other via the O-rings and the elastic members. At the same time, positioning is performed with the second O-ring between the outer surface of the intermediate ring and the inner surface of the annular part, so that the second O-ring improves vibration isolation in a lateral direction between the intermediate ring and the first flange.

In the configuration according to claim 1, 2, 3, 4, 5, 6, 7, or 8, an invention according to claim 9 provides a vacuum pump in which from among the intermediate rings stacked in the axial direction of the first flange, the upper intermediate ring partially includes an annular part having an inner surface disposed over an outer surface of the intermediate ring disposed under the upper intermediate ring, and the vacuum pump further includes a second O-ring between the outer surface of the lower intermediate ring and the inner surface of the annular part.

With this configuration, when the vacuum chamber is evacuated, the O-rings and the elastic members are elastically compressed by atmospheric pressures so as to reduce a clearance between the first flange and the second flange, the second flange or the first flange and the positioning members are not in contact with each other, and the first flange and the second flange are connected to each other via the O-rings and the elastic members. At the same time, positioning is performed with the second O-ring between the outer surface of the intermediate ring and the inner surface of the annular part, so that the second O-ring improves vibration isolation in a lateral direction between the intermediate ring and the first flange.

In the configuration according to claim 8 or 7, an invention according to claim 10 provides a vacuum pump in which the inner surface of the annular part has a plurality of protrusions spread in the circumferential direction of the inner surface, the protrusions extending toward the second O-ring.

With this configuration, the protrusions in contact with the outer surface of the second O-ring prevent a misalignment of the second O-ring from the inner surface of the annular part or the intermediate ring. This keeps the position of the second O-ring and improves vibration isolation in a lateral direction.

In the configuration according to claim 1, 2, 3, 4, 5, 6, 7, 8, 9, or 10, an invention according to claim 11 provides a vacuum pump in which the outer surface of the intermediate ring includes a collar portion extending outward from a part of the outer surface, and the elastic member is in contact with the outer surface of the collar portion.

With this configuration, the elastic member and the outer surface of the collar portion are in contact with each other, thereby preventing a lateral misalignment of the intermediate ring.

An invention according to claim 12 is a vacuum-pump damper for keeping airtightness between a vacuum chamber and a vacuum pump for evacuating the vacuum chamber, the vacuum-pump damper including: a first flange and a second flange, each having a central opening, the flanges being ring-shaped and disposed oppositely to each other; at least one intermediate ring, each of the at least one intermediate ring corresponding to the opening of the first flange and the opening of the second flange, having a central opening, and being disposed between the first flange and the second flange; O-rings disposed between the first flange and the at least one intermediate ring and between the at least one intermediate ring and the second flange; a plurality of elastic members circumferentially spread between the first flange and the at least one intermediate ring and between the at least one intermediate ring and the second flange; and airtightness keeping means including positioning members inserted into positioning holes sequentially provided on the first flange, the at least one intermediate ring, and the second flange.

With this configuration, using the vacuum pump can improve vibration isolation in a twisting direction in the vacuum pump and prevent rupture of the O-ring and the elastic member by regulating a misalignment of the flange surfaces facing each other.

According to the invention, when the vacuum chamber is evacuated, the first flange, the intermediate ring, and the second flange are connected only by the O-rings and the columns of the elastic members. Thus, a spring constant in a twisting direction is smaller than that of a vacuum pump using a damper of a conventionally known bellows system. This enhances the effect of vibration isolation. The elastic members are shaped like columns spreading around the inlet port and a ring-shaped elastic member surrounding the central opening serving as the inlet port is not used. Thus, a spring constant in a lateral direction can be set smaller than that of an O-ring elastic member, improving the capability of vibration isolation in the lateral direction. Furthermore, the vacuum pump and the vacuum-pump damper are provided so as to prevent rupture of the O-ring and the elastic member by regulating a misalignment of the flange surfaces facing each other. When the vacuum chamber is evacuated, the first flange and the second flange are electrically/mechanically insulated from each other, preventing undesirable electrical noise in the vacuum pump from propagating through the vacuum chamber.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIGS. 15A and 15B illustrate a fifth modification of the vacuum-pump damper of the present invention, FIG. 15A illustrating a part corresponding to a cross section taken along line A-A of FIG. 2, FIG. 15B illustrating a part corresponding to a cross section taken along line B-B of FIG. 2.

DETAILED DESCRIPTION

Figure 1:
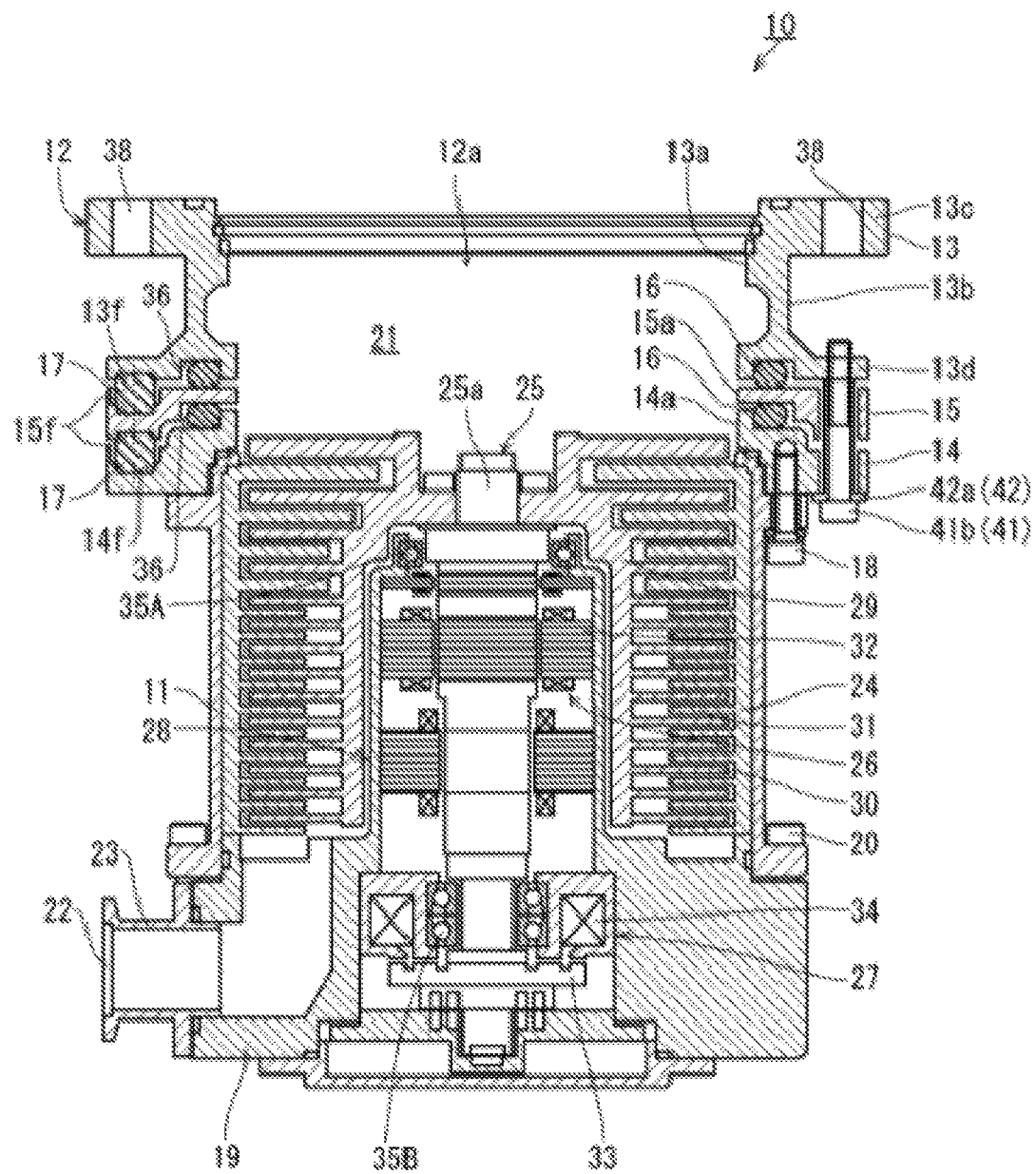
FIG. 1 is an axial-direction cross-sectional view illustrating a vacuum pump according to an embodiment of the present invention.

In order to attain the object to provide a vacuum pump and a vacuum-pump damper which can increase vibration isolation in a twisting direction with a simple structure and prevent rupture and damage of an O-ring and an elastic member by regulating a misalignment of flanges facing each other, the present invention achieved a vacuum-pump damper that keeps airtightness between a vacuum chamber and a vacuum pump for evacuating the vacuum chamber, the vacuum-pump damper including: a first flange and a second flange, each having a central opening for keeping airtightness between the vacuum chamber and the vacuum pump for evacuating the vacuum chamber, the flanges being ring-shaped and disposed opposely to each other; an intermediate ring, each of the at least one intermediate ring corresponding to the opening of the first flange and the opening of the second flange, having a central opening, and being disposed between the first flange and the second flange; O-rings, the O-rings being respectively disposed between the first flange and the intermediate ring and between the intermediate ring and the second flange and around the central opening; a plurality of elastic members, each of the plurality of elastic member being disposed such that the plurality of elastic member are spread in the circumferential direction of the central opening between the first flange and the intermediate ring and between the intermediate ring and the second flange; and airtightness keeping means, the airtightness keeping means including positioning members, the positioning members being disposed so as to sequentially penetrate through positioning holes provided on the first flange, the intermediate ring, and the second flange.

An embodiment for implementing the present invention will be specifically described below in accordance with the accompanying drawings. The same elements are indicated by the same reference numerals in the overall description of the embodiment. In the description, expressions indicating vertical and horizontal directions are not definite expressions. These expressions are appropriate in the drawings of the parts of the vacuum pump according to the present invention but the interpretation should be changed according to a change of the orientation of the vacuum pump.

EXAMPLE

FIG. 1 is an axial-direction cross-sectional view illustrating the overall configuration of a vacuum pump 10 according to the present invention. In this example, a turbo molecular pump is described as an example of the vacuum pump 10.

The vacuum pump 10 includes a vacuum-pump damper 12 that is disposed with airtightness between an external container (hereinafter, will be referred to as "vacuum chamber"), which is not illustrated, and a casing body 11.

The casing body 11 is a cylinder made of stainless steel (SUS) and contains an exhaust function unit as will be described later. The vacuum-pump damper 12 is connected to one end (upper end) of the casing body 11, and the vacuum-pump damper 12 and the casing body 11 are fixed with a bolt 18. The vacuum-pump damper 12 is provided to prevent vibrations caused by a rotation near the casing body 11 from propagating through the vacuum chamber.

A base 19 is connected to the other end (lower end) of the casing body 11, and the base 19 and the casing body 11 are fixed with a bolt 20. The base 19 forms a hollow part 21, which communicates with the vacuum chamber through an inlet port 12a, with the casing body 11 and the vacuum-pump damper 12. Moreover, an outlet port part 23 including an outlet port 22 for exhausting gas in the hollow part 21 is attached to the base 19.

The casing body 11 further includes a stator portion 24 that constitutes a part of the exhaust function unit, is supported by the base 19, and is stored in the hollow part 21 and a rotor portion 25 stored in the hollow part. Moreover, the casing body 11 includes magnetic bearing portions 26 and 27 that support the rotor portion 25 rotatably relative to the stator portion 24, and a motor 28 for rotating the rotor portion 25, which is supported by the magnetic bearing portions 26 and 27, relative to the stator portion 24 via a rotor shaft 25a.

The rotor portion 25 has a cylindrical wall part 29. Multiple rotor blades 30 are radially and axially formed in multiple stages around the cylindrical wall part 29. The rotor blades 30 are inclined at a predetermined angle with respect to the axial direction so as to rotate toward the inlet port (upward in FIG. 1). The stator portion 24 includes stator blades 31 disposed between the stages of the rotor blades 30.

The stator blades 31 are inclined at a predetermined angle with respect to the axial direction. When the rotor portion 25 is rotated by the motor 28, the rotor blades 30 and the stator blades 31 act to hit gas molecules down the outlet port 22.

A magnetic bearing for supporting the rotor portion 25 with a magnetic force is a magnetic bearing of three-axis control. The rotor portion 25 is magnetically levitated in a radial direction (a radial direction of the rotor shaft 25a) by the magnetic bearing portion 26 and is supported in a noncontact manner. The rotor portion 25 is magnetically levitated in the thrust direction (the axial direction of the rotor shaft 25a) by the magnetic bearing portion 27 and is supported in a noncontact manner.

In the magnetic bearing portion 26, four radial electromagnets 32 facing one another are disposed at 90 degree intervals around the rotor shaft 25a (FIG. 1 illustrates two of the electromagnets). The rotor shaft 25a opposed to the radial electromagnets 32 is made of a high-permeability material and receives the magnetic forces of the radial electromagnets 32.

Under the rotor shaft 25a, a disc-like metallic disc 33 made of a magnetic substance is fixed. Above the metallic disc 33, axial electromagnets 34 are fixed to the base 19. A magnetizing current is supplied to the radial electromagnets 32 and the axial electromagnets 34, thereby magnetically levitating the rotor portion 25.

In the vacuum pump 10 of the present embodiment, protection bearings 35A and 35B are disposed in the upper and lower parts of the rotor portion 25. In normal times, the rotor portion 25 is supported by the magnetic bearing portions 26 and 27 in a noncontact manner when being rotated. In the event of a touchdown, the rotor portion 25 is supported by the protection bearings 35A and 35B instead of the magnetic bearing portions 26 and 27, thereby protecting the overall apparatus. In the present embodiment, the rotor portion 25 is supported by, but is not limited to, the magnetic bearing portions 26 and 27. The rotor portion 25 may be supported by a hydrodynamic bearing, a hydrostatic bearing, or other bearings.

Figure 2:
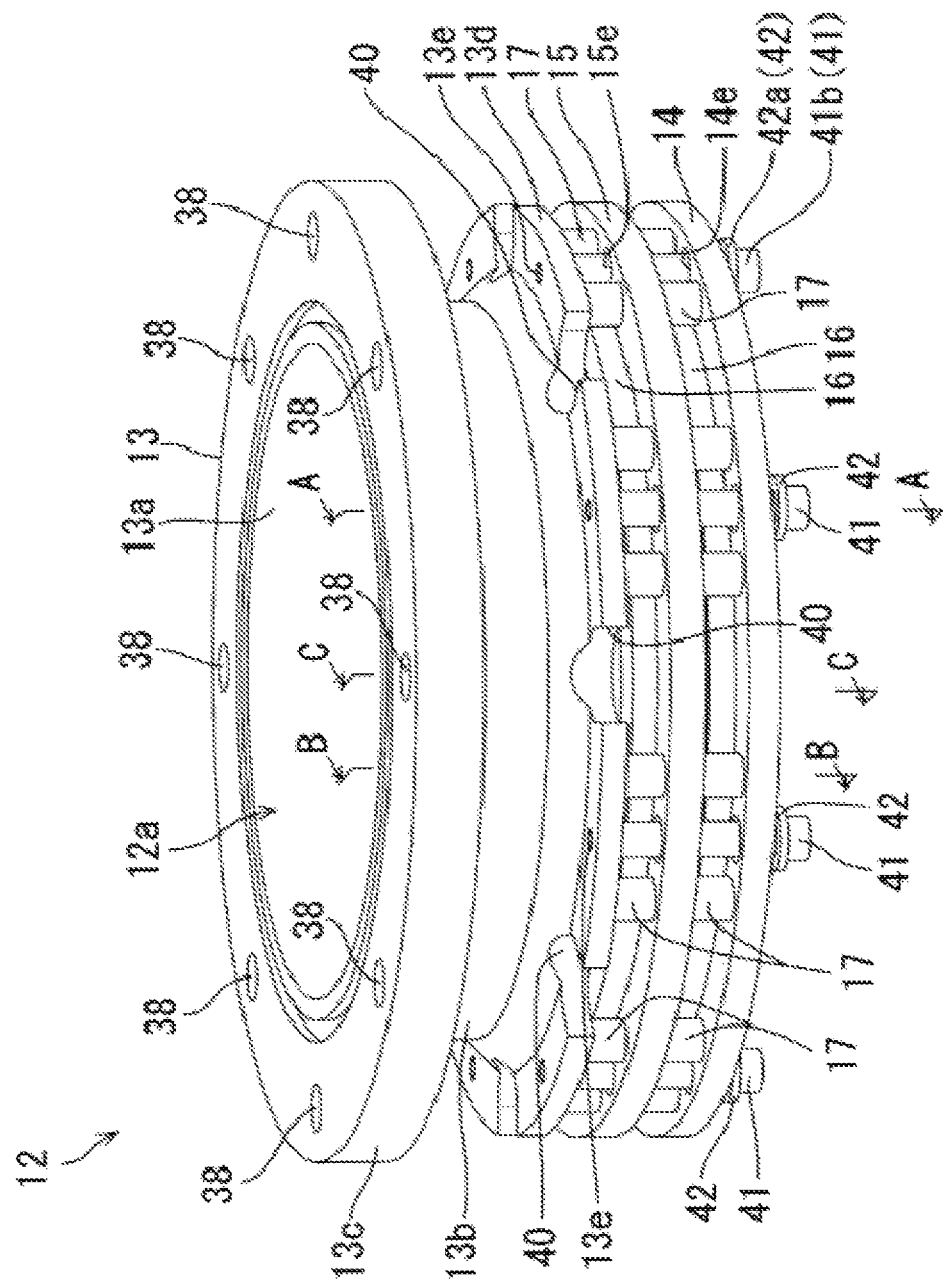
FIG. 2 is an assembly perspective view of a vacuum-pump damper used for the vacuum pump.
Figure 3:
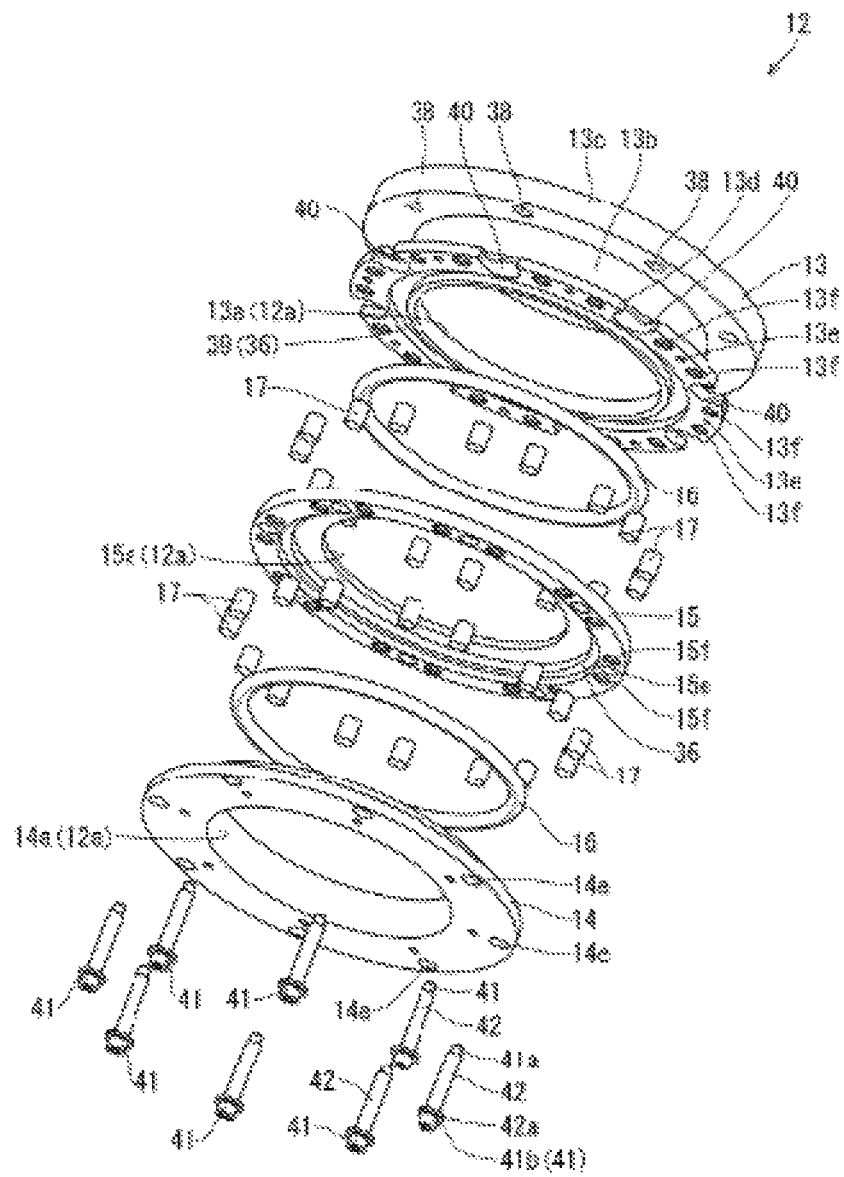
FIG. 3 is an exploded perspective view of the vacuum-pump damper in FIG. 2.
Figure 4A:
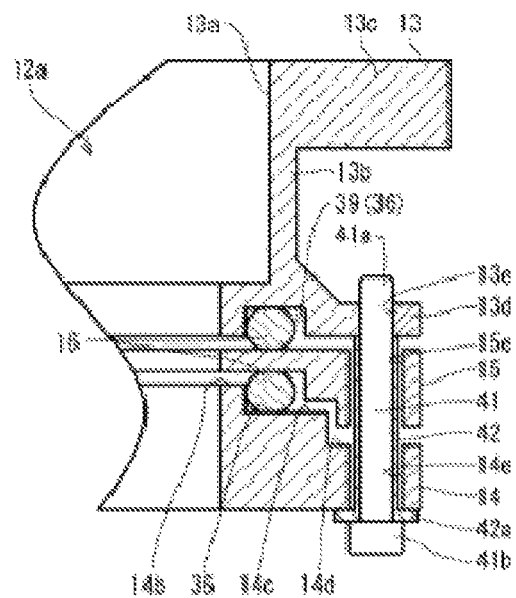
FIGS. 4A and 4B are cross-sectional views taken along line A-A of FIG. 2, FIG. 4A illustrating the vacuum chamber that is not evacuated, FIG. 4B illustrating the evacuated vacuum chamber.
Figure 4B:
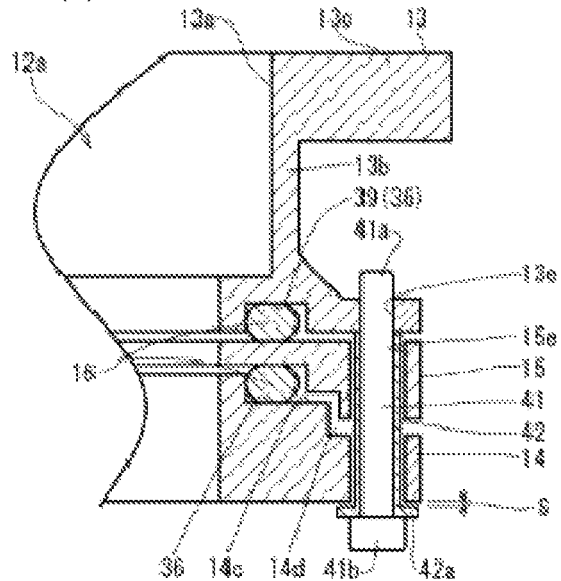
Figure 5:
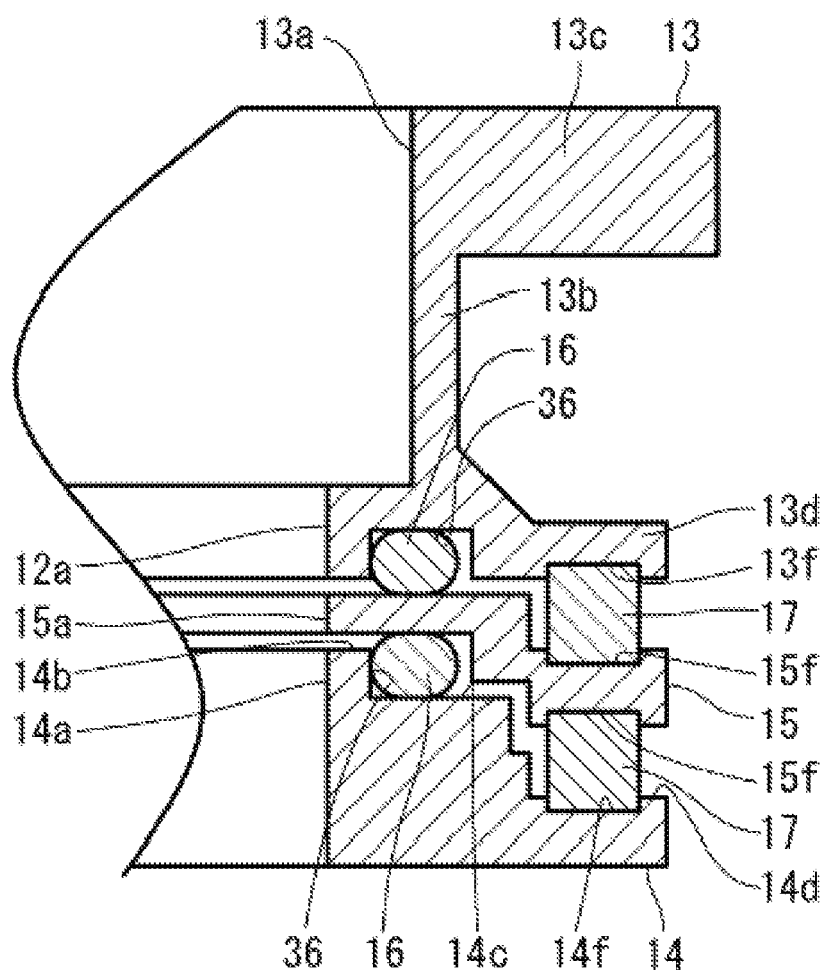
FIGS. 5A and 5B are cross-sectional views taken along line B-B of FIG. 2.

FIGS. 2 to 5 and 8 illustrate the details of the structure of the vacuum-pump damper 12 in FIG. 1. FIG. 2 is an assembly perspective view of the vacuum-pump damper 12. FIG. 3 is an exploded perspective view of the vacuum-pump damper 12 in FIG. 2. FIG. 4 is a cross-sectional view taken along line A-A of FIG. 2. FIG. 5 is a cross-sectional view taken along line B-B of FIG. 2. FIGS. 8A and 8B are cross-sectional views taken along line C-C of FIG. 2. Referring to FIGS. 2 to 5 and 8 in addition to FIG. 1, the detailed structure of the vacuum-pump damper 12 will be specifically described below.

In FIGS. 1 to 8, the vacuum-pump damper 12 includes a first flange 13 whose top surface is connected to the vacuum chamber while being kept airtight, a second flange 14 whose undersurface is connected to the casing body 11 while being kept airtight as illustrated in FIG. 1, and an intermediate ring 15 interposed between the undersurface of the first flange 13 and the top surface of the second flange 14. The second flange 14, the intermediate ring 15, and the first flange 13 are made of stainless steel (SUS). Furthermore, the second flange 14, the intermediate ring 15, and the first flange 13 are annularly formed while the inlet port 12a for sucking gas in the vacuum chamber is provided at the center. As illustrated in FIGS. 1, 2, and 3, the vacuum-pump damper 12 is configured such that the second flange 14, the intermediate ring 15, and the first flange 13 are sequentially stacked in the axial direction so as to face one another and are integrally disposed between the vacuum chamber and the casing body 11.

The vacuum-pump damper 12 further includes O-rings 16 surrounding a central opening serving as the inlet port 12a. One of the O-rings 16 is disposed between the undersurface of the first flange 13 and the top surface of the intermediate ring 15 and the other is disposed between the undersurface of the intermediate ring 15 and the top surface of the second flange 14. Furthermore, around the O-rings 16, a plurality of elastic members 17 are spread between the undersurface of the first flange 13 and the top surface of the intermediate ring 15 and between the undersurface of the intermediate ring 15 and the top surface of the second flange 14.

Moreover, between the undersurface of the first flange 13 and the top surface of the intermediate ring 15 and between the undersurface of the intermediate ring 15 and the top surface of the second flange 14, the O-rings 16 to be placed are held between the first flange 13 and the intermediate ring 15 and between the intermediate ring 15 and the second flange 14 such that the flanges and the ring face one another. Positioning recesses 36 for positioning and holding the held O-rings 16 outside the central opening a annularly formed.

Figure 6A:
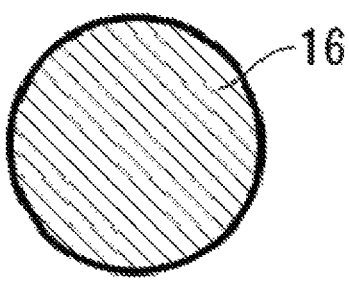
FIGS. 6A to 6C are cross-sectional views illustrating O-rings suitably used for the vacuum-pump damper, FIG. 6A illustrating the cross-sectional view of the O-ring actually used in the present example, FIGS. 6B and 6C illustrating the cross-sectional views of other O-rings usable for the present example.
Figure 6B:
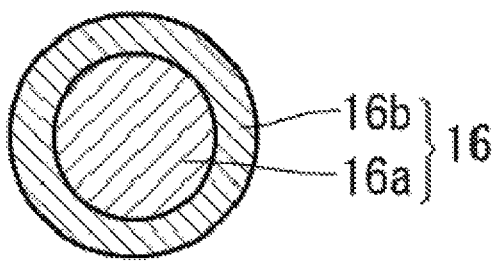
Figure 6C:
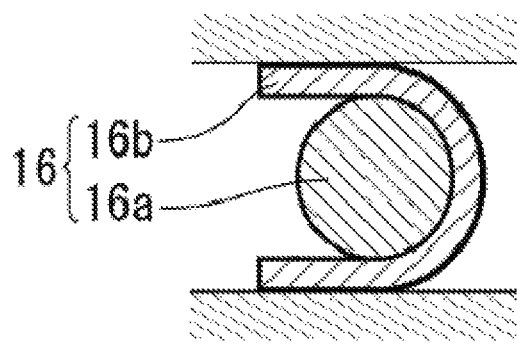

The O-ring 16 are made of fluorocarbon rubber that has electrical insulating properties and is elastically deformable. The O-rings 16 are substantially circular in cross section as illustrated in FIG. 6A. The O-rings 16 are not limited to the structure of fluorocarbon rubber alone in FIG. 6A. For example, as illustrated in FIG. 6B, the O-rings 16 may have an electrically insulating composite structure in which the outer surface of a core 16a made of silicon rubber is coated and integrated with a fluorine dissimilar material 16b. Alternatively, the dissimilar material 16b may not be provided over the outer surface of the core 16a. For example, as illustrated in FIG. 6C, the O-rings 16 may have a composite structure in which the dissimilar material 16b only covers a part between the undersurface of the first flange 13 and the top surface of the intermediate ring 15 and a part between the undersurface of the intermediate ring 15 and the top surface of the second flange 14.

More specifically, the first flange 13 includes a combination of a cylindrical flange body 13b having a central opening 13a serving as the inlet port 12a, an upper flange part 13c horizontally extending like a collar from the upper edge of the flange body 13b to the outside, and a lower flange part 13d horizontally extending like a collar from the lower edge of the flange body 13b to the outside.

Furthermore, mounting holes 38 for mounting fixing screws 37 (FIGS. 8A and 8B) for fixation between the first flange 13 and the vacuum chamber vertically penetrate the upper flange part 13c of the first flange 13. The mounting holes 38 (eight mounting holes in the example) are typically disposed at substantially regular intervals.

Figure 8A:
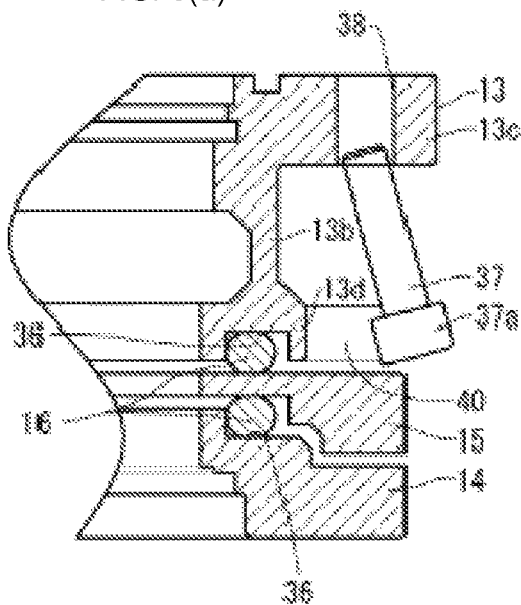
FIGS. 8A and 8B are cross-sectional views taken along line C-C of FIG. 2, FIG. 8A illustrating a structural drawing of application in the example of the vacuum-pump damper, FIG. 8B illustrating an explanatory drawing of the effect of the structure according to the present example in FIG. 8A.
Figure 8B:
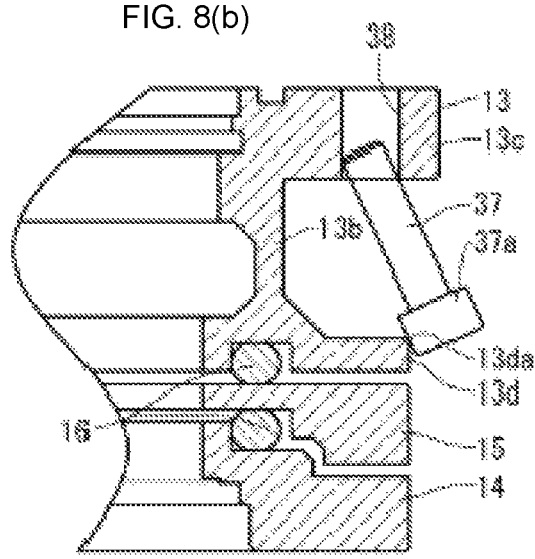

The lower flange part 13d of the first flange 13 has a recessed groove 39 that is annularly formed on the undersurface of the lower flange part 13d so as to surround the central opening 13a. The recessed groove 39 forms the positioning recess 36 for positioning the O-ring 16 disposed with the intermediate ring 15 near the first flange 13. The O-ring 16 disposed near the first flange 13 is partially stored in the recessed groove 39 and the other part is protruded from the recessed groove 39. The lower flange part 13d has notches 40 for releasing heads 37a of the fixing screws 37. The notches 40 are formed from the outer edge of the lower flange part 13d toward the inside (the central opening 13a) and are disposed at a point corresponding to the mounting holes 38 formed on the upper flange part 13c, that is, at eight points corresponding to the eight mounting holes 38. If the notches 40 are not provided as illustrated in FIG. 8B, when the fixing screws 37 are inserted into the mounting holes 38 so as to attach the vacuum-pump damper 12 to the vacuum chamber, the heads 37a of the fixing screws 37 hit an outer edge 13da of the lower flange part 13d, leading to difficulty in mounting the fixing screws 37. However, if the notches 40 are provided as illustrated in FIG. 8A, the heads 37a of the fixing screws 37 a released by the notches 40 and are smoothly mounted without hitting the outer edge 13da of the lower flange part 13d. In other words, the provision of the notches 40 facilitates the mounting operation of the fixing screws 37.

Moreover, the lower flange part 13d of the first flange 13 includes positioning holes 13e where distal ends 41a of positioning pins 41 serving as positioning members are inserted, and recesses (hollows) 13f for positioning the elastic members 17. The positioning holes 13e and 13f are disposed between the notches 40. As illustrated in FIG. 3, the eight positioning holes 13e are provided in total and each of the positioning holes 13e is disposed at a substantially intermediate point between the adjacent notches 40. The 16 recesses 13f are provided in total and each of the recesses 13f is disposed at a substantially intermediate point between each of the two adjacent notches 40 and the positioning hole 13e. The number of notches 40, the number of positioning holes 13e, and the number of recesses 13f are not limited and may be changed as necessary. Moreover, the inner surface of the positioning hole 13e has an internal thread and the outer surface of the distal end 41a of the positioning pin 41 has an external thread screwed into the internal thread on the inner surface of the positioning hole 13e. The internal and external threads are not illustrated.

The second flange 14 is formed into a ring plate having a central opening 14a that is an opening serving as the inlet port 12a. As illustrated in FIGS. 4A and 4B and 5, the top surface of the second flange 14 (a surface opposed to the first flange 13 and the intermediate ring 15) includes a first step portion 14b annularly formed around the central opening 14a, a second step portion 14c annularly formed outside the first step portion 14b so as to be lower than the first step portion 14b, and a third step portion 14d annularly formed outside the second step portion 14c so as to be lower than the second step portion 14c. The first step portion 14b and the second step portion 14c form the positioning recess 36 for positioning the O-ring 16 disposed near the second flange 14, with the intermediate ring 15 opposed to the step portions. The O-ring 16 disposed near the second flange 14 is in contact with the outer periphery of the first step portion 14b and is disposed on the second step portion 14c.

As illustrated in FIGS. 2, 3, 4A, and 4B, the third step portion 14d of the second flange 14 includes eight positioning holes 14e that are provided at substantially equal intervals, so as to correspond to the positioning holes 13e of the first flange 13, and 16 recesses (hollows) 14f for positioning the elastic members 17, the recesses 14f corresponding to the recesses 13f of the first flange 13.

The intermediate ring 15 is formed into a ring plate having a central opening 15a that is an opening serving as the inlet port 12a. As illustrated in FIGS. 1, 3, 4A, 4B, and 5, the undersurface of the intermediate ring 15 (a surface opposed to the second flange 14) includes eight positioning holes 15e that are provided at substantially equal intervals so as to correspond to the positioning holes 13e and 14e of the first flange 13 and the second flange, and 16 recesses (hollows) 15f for positioning the elastic members 17, the recesses 15f corresponding to the recesses 13f and 14f of the first flange 13 and the second flange 14. As illustrated in FIGS. 1, 4A, 4B, and 5, the top surface of the intermediate 15 (a surface opposed to the first flange 13) includes 16 recesses (hollows) 15f for positioning the elastic members 17, the recesses 15f, so as to correspond to the recesses 13f and 14f provided on the first flange 13 and the second flange 14 and the recesses 15f provided on the undersurface of the intermediate ring 15.

Figure 7A:
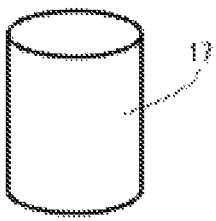
FIGS. 7A to 7E are perspective views illustrating elastic members used for the vacuum-pump damper, FIG. 7A illustrating the external perspective view of the elastic member used in the present example, FIGS. 7B to 7E illustrating the external perspective views of other elastic members suitably used for the present example.
Figure 7B:
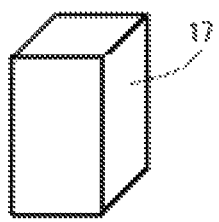
Figure 7C:
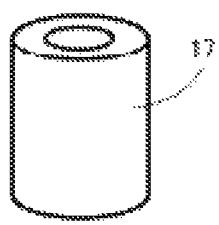
Figure 7D:
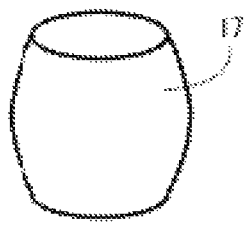
Figure 7E:
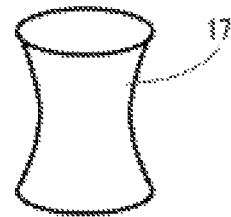

As illustrated in FIGS. 2, 3, and 7A, the elastic members 17 are cylindrical elastic members made of silicon rubber or the like. Thus, the recesses 13f of the first flange 13, the recesses 14f of the second flange 14, and the recesses 15f of the intermediate ring 15 are substantially circularly formed in cross section according to the round shapes of the upper and lower end faces of the elastic members 17. The recesses 13f, 14f, and 15f prevent the elastic members disposed in the recesses 13f, 14f, and 15f from slipping in the horizontal direction. The elastic members 17 are not limited to cylinders. For example, the elastic member 17 may be formed into a prism as illustrated in FIG. 7B. Additionally, the elastic member 17 may be shaped like a hollow cylinder in FIG. 7C, a cylinder having an expanding intermediate portion like a beer barrel in FIG. 7D, and a cylinder having a constricted intermediate portion in FIG. 7E. If the cylindrical shapes of the elastic members 17 are changed, the shapes of the recesses 13f, 14f, and 15f are also preferably changed according to the shapes of the upper and lower ends of the elastic members 17.

The positioning pin 41 serving as a positioning member has a head 41b on the lower end, on the opposite side from the distal end 41a having external thread. Moreover, a conductive sleeve 42 with a collar portion 42a on one end (lower end) is attached to the outer surface of the positioning pin 41. The sleeve 42 is attached onto the positioning pin 41 from the distal end 41a of the positioning pin 41 with the collar portion 42a placed facedown until the collar portion 42a comes into contact with the head 41b.

The positioning pins 41 with the sleeves 42 constitute airtightness keeping means 51 that keeps airtightness obtained by the O-ring 16 between the first flange 13 and the second flange 14 when the vacuum chamber evacuated by the vacuum pump 10. When the vacuum chamber is evacuated, the O-rings 16 and the elastic members 17 are compressed, one of the first flange 13 and the second flange 14 (the second flange 14 in the present embodiment) is moved in the axial direction of flanges 13 and 14, and the positioning pins 41 are electrically and mechanically (hereinafter, will be referred to as "electrically/mechanically") separated from one of the flanges 13 and 14. The positioning pin 41 with the sleeve 42 is inserted from the undersurface of the second flange 14 sequentially through the positioning hole 14e of the second flange 14 and the positioning hole 15e of the intermediate ring 15. Thereafter, the external thread of the distal end 41a of the positioning pin 41 is screwed into the internal thread of the positioning hole 13e of the first flange 13, so that the positioning pin 41 is screwed and fixed until the insertion is restricted by the length of the sleeve 42.

When the first flange 13, the intermediate ring 15, and the second flange 14 are sequentially stacked and are fixed with the positioning pins 41, the O-ring 16 is disposed between the undersurface of the first flange 13 and the top surface of the intermediate ring 15 and the O-ring 16 is disposed between the undersurface of the intermediate ring 15 and the top surface of the second flange 14. Each of the O-rings 16 is elastically compressed slightly into the positioning recess 36. The 16 elastic members 17 between the undersurface of the first flange 13 and the top surface of the intermediate ring 15 and the 16 elastic members 17 between the top surface of the second flange 14 and the undersurface of the intermediate ring 15 are positioned while being elastically compressed slightly into the recesses 13f, 14f, and 15f. The O-rings 16 and the elastic members 17 are fixed with the positioning pins 41 so as to be held between the first flange 13 and the intermediate ring 15 and between the intermediate ring 15 and the second flange 14, so that the O-rings 16 and the elastic members 17 are integrated with the first flange 13, the intermediate ring 15, and the second flange 14.

In the integrated vacuum-pump damper 12, when the vacuum chamber is not evacuated, a distance between the first flange 13 and the second flange 14 is set by the sleeves 42. The first flange 13 and the intermediate ring 15 are separated from each other and the intermediate ring 15 and the second flange 14 are separated from each other by the repulsive forces of the O-rings 16 and the elastic members 17 while being sealed with the O-rings 16. In this state, the collar portion 42a of the sleeve 42 and the undersurface of the second flange 14 are electrically/mechanically in close contact with each other as illustrated in FIG. 4A, and the first flange 13 and the second flange 14 are electrically connected to each other via the conductive sleeve 42.

When the vacuum chamber is evacuated by the vacuum pump 10, the O-rings 16 and the elastic members 17 are elastically compressed by atmospheric pressures so as to reduce clearances among the first flange 13, the intermediate ring 15, and the second flange 14. As illustrated in FIG. 4B, the undersurface of the second flange 14 and the collar portion 42a of the sleeve 42 are mechanically separated from each other and form a clearance S, the first flange 13 and the second flange 14 are electrically insulated from each other, and even undesirable electrical noise in the vacuum pump 10 does not propagate through the vacuum chamber via the flanges 13 and 14.

The vacuum-pump damper 12 formed as illustrated in FIG. 1 is attached and fixed to one end (upper end) of the casing body 11 with the bolt 18 and is integrated with the casing body 11 while being kept airtight. After the vacuum-pump damper 12 is integrated with the casing body 11, as illustrated in FIG. 8A, the fixing screws 37 are inserted into the mounting holes 38 of the first flange 13 and are screwed to the vacuum chamber, so that the vacuum-pump damper 12 is attached and fixed to the vacuum chamber while being kept airtight and allows the assembly of the vacuum pump 10.

The operations of the vacuum pump 10 including the vacuum-pump damper 12 disposed between the vacuum chamber and the vacuum pump 10 will be described below. As described above, the vacuum pump 10 is fixed to the external vacuum chamber via the vacuum-pump damper 12. In this state, the motor 28 of the vacuum pump 10 is driven. The driving of the motor 28 rotates the rotor blades 30 at high speed along with the rotor portion 25. Thus, gas from the inlet port 12a is transferred by the rotor blades 30 and the stator blades 31 and is exhausted from the outlet port 22. In other words, the vacuum chamber is evacuated.

Before the vacuum chamber is evacuated, that is, when the vacuum chamber is not evacuated, the first flange 13 and the intermediate ring 15 are separated from each other and the intermediate ring 15 and the second flange 14 are separated from each other in the vacuum-pump damper 12 by the repulsive forces of the O-rings 16 and the elastic members 17 while being sealed with the O-rings 16. As illustrated in FIG. 4A, the collar portion 42a of the sleeve 42 and the undersurface of the second flange 14 are in close contact with each other and the first flange 13 and the second flange 14 are electrically connected to each other via the conductive sleeve 42.

When the vacuum chamber is evacuated, in the vacuum-pump damper 12, the O-rings 16 and the elastic members 17 are elastically compressed by atmospheric pressures so as to reduce clearances among the first flange 13, the intermediate ring 15, and the second flange 14. As illustrated in FIG. 4B, the clearance S is created between the undersurface of the second flange 14 and the collar portion 42a of the sleeve 42, the first flange 13 and the second flange 14 are electrically/mechanically insulated from each other, and the first flange 13, the intermediate ring 15, and the second flange 14 are connected to one another only by the O-rings 16 and the columns of the elastic members 17. Thus, in the vacuum pump 10, the insulation between the first flange 13 and the second flange 14 prevents undesirable electrical noise in the vacuum pump 10 from propagating through the vacuum chamber via the flanges 13 and 14.

When the motor 28 is driven in the vacuum pump 10, vibrations are generated by the imbalance of the rotor portion 25 or the cogging of the motor 28. The vibrations are propagated through the casing body 11 and the vacuum-pump damper 12. If a back pump is connected to the outlet port 22 of the vacuum pump 10, vibrations from the back pump are similarly propagated through the casing body 11 and the vacuum-pump damper 12 via a connecting pipe or the like.

In the vacuum-pump damper 12, however, the O-rings 16 and the elastic members 17 are elastically compressed by atmospheric pressures so as to reduce clearances among the first flange 13, the intermediate ring 15, and the second flange 14 and the first flange 13, the intermediate ring 15, and the second flange 14 are connected to one another only by the O-rings 16 and the columns of the elastic members 17, so that vibrations propagating through the vacuum chamber are isolated and considerably reduced by the O-rings 16 and the elastic members 17.

In a state in which the first flange 13, the intermediate ring 15, and the second flange 14 are particularly connected only by the O-rings 16 and the columns of the elastic members 17, a spring constant in a twisting direction is smaller than that of a damper using a conventionally known bellows system described in Japanese Patent Application Publication No. 2003-3988. This enhances the effect of vibration isolation.

In the present example, the elastic members 17 are shaped like columns spreading around the inlet port 12a and a ring-shaped elastic member surrounding the inlet port 12a is not used. Thus, a spring constant in a lateral direction can be set smaller than that of an O-ring elastic member, improving the capability of vibration isolation in the lateral direction.

The number of positioning holes 13e, 14e, and 15e and the number of recesses 13f, 14f, and 15f are not limited to those of the present example. Moreover, the O-ring 16 disposed between the first flange 13 and the intermediate ring 15 and the O-ring disposed between the intermediate ring 15 and the second flange 14 may vary in stiffness.

The present example disclosed a structure in which the intermediate ring 15 is disposed between the first flange 13 and the second flange 14, the O-ring 16 and the elastic members 17 are disposed between the first flange 13 and the intermediate ring 15, and the O-ring 16 and the elastic members 17 are disposed between the intermediate ring 15 and the second flange 14. The intermediate ring 15 may be omitted and the O-ring 16 and the elastic members 17 may be disposed between the first flange 13 and the second flange 14 without the intermediate ring 15.

Figure 9:
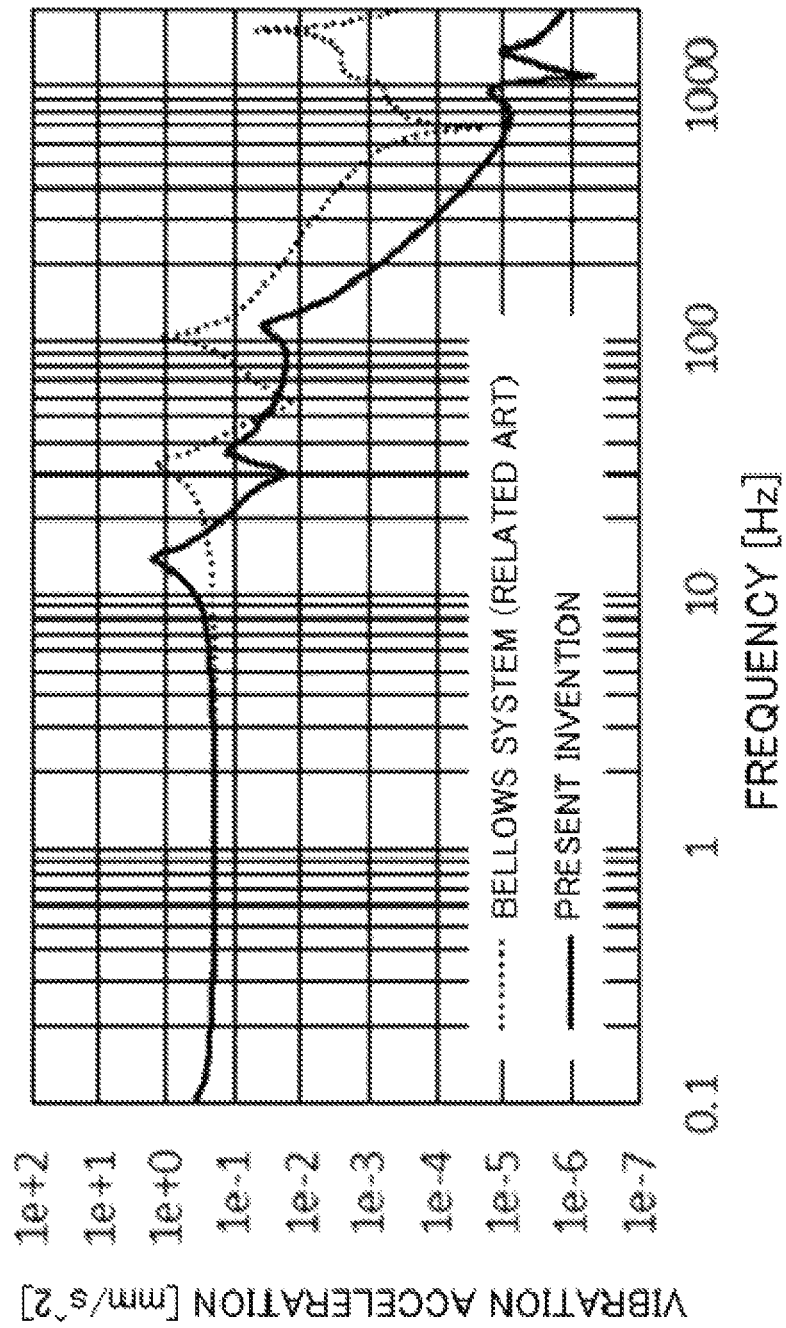
FIG. 9 indicates an example of experimental data on vibration acceleration when the vacuum-pump damper of the present invention is used and when a damper of a conventional bellows system is used.

FIG. 9 indicates experimental data on radial vibration acceleration transmitted from a vacuum pump to an antivibration table (vacuum casing) for the vacuum-pump damper 12 according to the present invention, in which the first flange 13 and the second flange 14 are connected to each other via the O-ring 16 and the columns of the elastic members 17, and the damper using the conventionally known bellows system described in Japanese Patent Application Publication No. 2003-3988. In FIG. 9, a solid line indicates the structure of the present invention in which the first flange 13 and the second flange 14 are connected to each other via the O-ring 16 and the columns of the elastic members 17 and a dotted line indicates the conventional bellows system. The vertical axis indicates vibration acceleration (mm/SA2) and the horizontal axis indicates a frequency (Hz). According to the experimental data in FIG. 9, the vacuum-pump damper 12 of the present invention gradually reduces vibration acceleration from 11 Hz and considerably reduces vibration acceleration from 15 Hz. Thus, it is understood that vibration isolation is improved as compared with the use of the conventional bellows system.

Figures 10A, 10B:
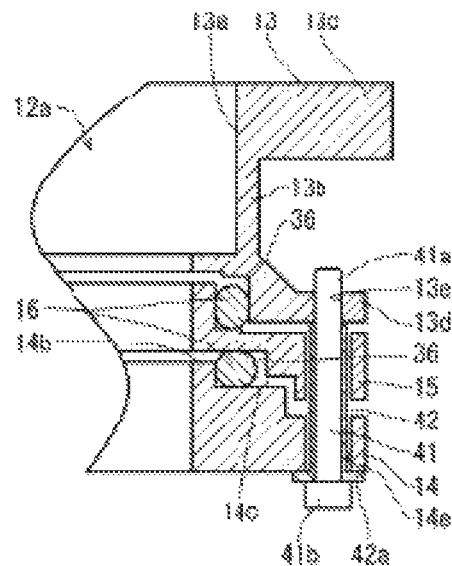
FIGS. 10A and 10B illustrate a first modification of the vacuum-pump damper of the present invention, that is, a part corresponding to a cross section taken along line A-A of FIG. 2.

FIGS. 10A and 10B illustrate a first modification of the vacuum-pump damper 12 in FIGS. 1 to 8. FIG. 10A illustrates a part corresponding to a cross section taken along line A-A of FIG. 2. FIG. 10B illustrates a part corresponding to a cross section taken along line B-B of FIG. 2. The first modification in FIGS. 10A and 10B illustrates a structure in which vibration isolation in the axial direction (vertical direction) is improved more than in a radial direction (lateral direction). Specifically, in the vacuum-pump damper 12 in FIGS. 10A and 10B, the positioning recess 36 formed between the first flange 13 and the intermediate ring 15 has a width smaller than the diameter of the O-ring 16 in a radial direction (lateral direction) and the positioning recess 36 formed between the second flange 14 and the intermediate ring 15 has a width smaller than the diameter of the O-ring 16 in the axial direction (height direction). When the vacuum chamber is not evacuated by the vacuum pump 10 in the vacuum-pump damper 12 of the first modification, the O-ring 16 positioned in the positioning recess 36 between the first flange 13 and the intermediate ring 15 is compressed and sealed by the inner wall surfaces of both sides of the positioning recess 36 in a radial direction (lateral direction) and the O-ring 16 positioned in the positioning recess 36 between the second flange 14 and the intermediate ring 15 is compressed and sealed by the top surface of the second flange 14 and the undersurface of the intermediate ring 15.

In this state, the spring constant of the O-ring 16 in a compressing direction is several times larger than that in a shearing direction. Thus, in order to reduce the spring constant in the axial direction, an O-ring may be compressed and sealed by the inner wall surfaces of both sides of the positioning recess 36 like the O-ring 16 positioned in the positioning recess 36 between the first flange 13 and the intermediate ring 15. Conversely, in order to increase the spring constant in the axial direction and reduce the spring constant in the radial direction, an O-ring may be compressed and sealed by the top surface of the second flange 14 and the undersurface of the intermediate ring 15 like the O-ring 16 positioned in the positioning recess 36 between the second flange 14 and the intermediate ring 15.

Thus, in the structure of the first modification, the O-ring 16 positioned in the positioning recess 36 between the first flange 13 and the intermediate ring 15 improves vibration isolation in the axial direction and the O-ring 16 positioned in the positioning recess 36 between the second flange 14 and the intermediate ring 15 improves vibration isolation in the radial direction. Unlike the structure of FIGS. 10A and 10B, the two positioning recesses 36 for positioning the O-rings 16 may be configured such that the O-ring 16 positioned between the first flange 13 and the intermediate ring 15 improves vibration isolation in the radial direction and the O-ring positioned between the second flange 14 and the intermediate ring 15 improves vibration isolation in the axial direction.

Figure 11:
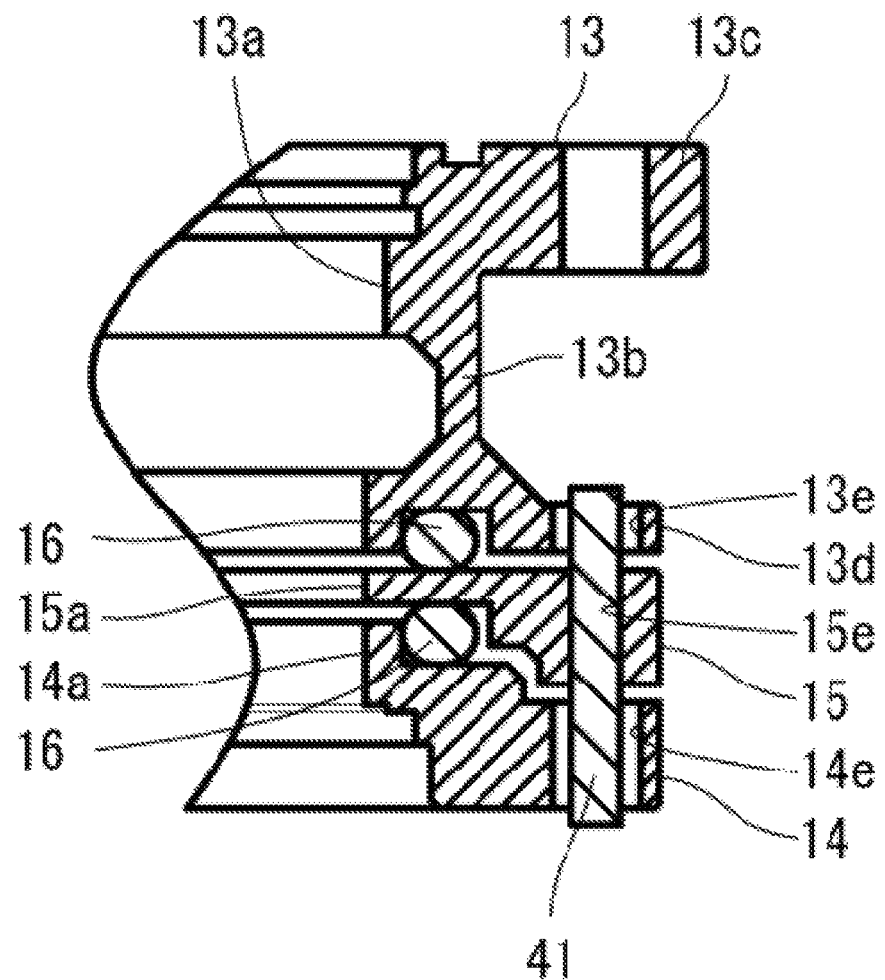
FIG. 11 illustrates a second modification of the vacuum-pump damper of the present invention, that is, a part corresponding to a cross section taken along line A-A of FIG. 2.

FIG. 11 illustrates a second modification of the vacuum-pump damper 12 in FIGS. 1 to 8. FIG. 11 illustrates a part corresponding to a cross section taken along line A-A of FIG. 2. In the first modification in FIGS. 10A and 10B, the inside diameter of the positioning hole 15e of the intermediate ring 15 is substantially equal to the outside diameter of the positioning pin 41 serving as a positioning member, and the inside diameter of the positioning hole 13e of the first flange 13 and the inside diameter of the positioning hole 14e of the second flange 14 are larger than the outside diameter of the positioning pin 41.

In the second modification, the positioning pin 41 is fixed into the intermediate ring 15 such that the middle part of the positioning pin 41 serving as a positioning member is press-fit and fixed into the positioning hole 15e of the intermediate ring 15. Furthermore, the first flange 13 and the second flange 14 are disposed on and under the intermediate ring 15. At this point, the O-ring 16 and the elastic members 17 are disposed between the first flange 13 and the intermediate ring 15 and the O-ring 16 and the elastic members 17 are disposed between the intermediate ring 15 and the second flange 14. The positioning pins 41 are inserted into the positioning holes 13e and the positioning holes 14e in a noncontact manner, and then the first flange 13, the intermediate ring 15, and the second flange 14 are held to be integrated into one unit by a member, which is not illustrated.

In the structure of the vacuum-pump damper 12 of the second modification, when the vacuum chamber is evacuated, atmospheric pressures are applied between the first flange 13 and the intermediate ring 15 and between the intermediate ring 15 and the second flange 14, so that the O-rings 16 and the elastic members 17 are elastically compressed to reduce the clearances. Hence, in the second modification, the sleeve attached to the positioning pin 41 can be omitted. This allows the placement of the positioning pin 41 in a small space. If the rotor portion 25 is broken for some reason and generates a large twisting torque, the positioning pin 41 absorbs the torque and prevents the vacuum-pump damper 12 from being twisted and broken.

Figure 12A:
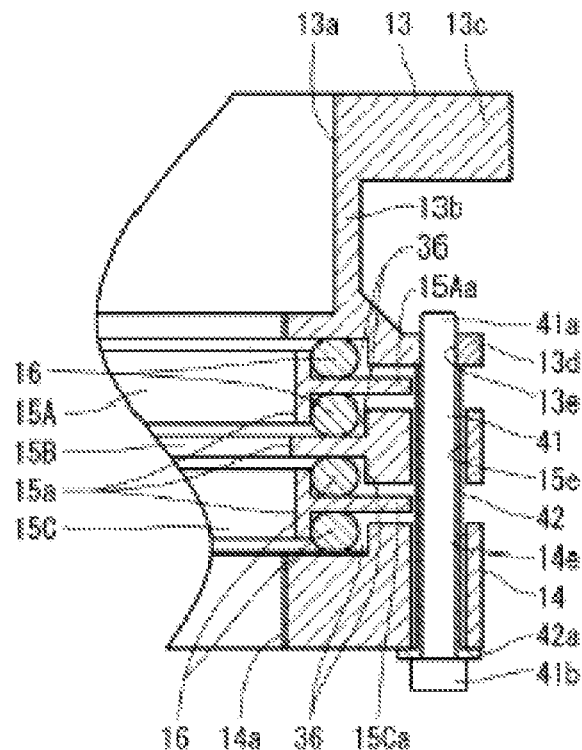
FIGS. 12A and 12B illustrate a third modification of the vacuum-pump damper of the present invention, FIG. 12A illustrating a part corresponding to a cross section taken along line A-A of FIG. 2, FIG. 12B illustrating a part corresponding to a cross section taken along line B-B of FIG. 2.
Figure 12B:
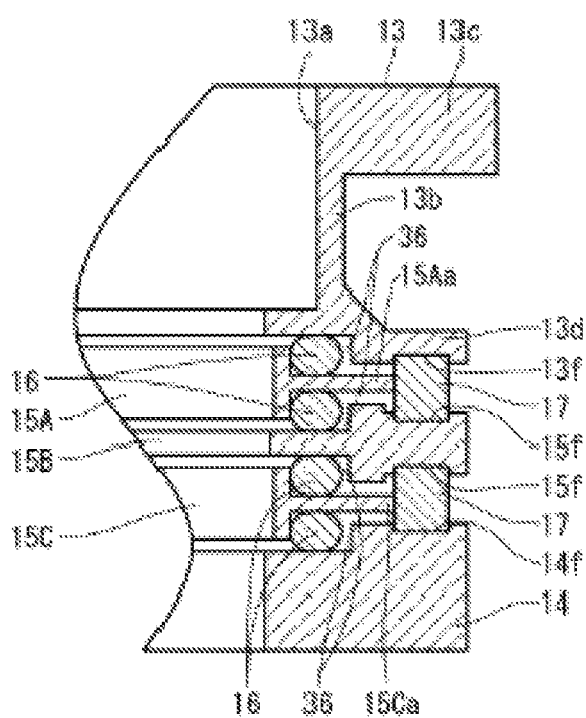

FIGS. 12A and 12B illustrate a third modification of the vacuum-pump damper of the present invention. FIG. 12A illustrates a part corresponding to a cross section taken along line A-A of FIG. 2. FIG. 12B illustrates a part corresponding to a cross section taken along line B-B of FIG. 2. In the third modification in FIGS. 12A and 12B, three intermediate rings, that is, an intermediate ring 15A, an intermediate ring 15B, and an intermediate ring 15C are sequentially stacked between the first flange 13 and the second flange 14.

Moreover, the intermediate ring 15A and the intermediate ring 15C includes collar portions 15Aa and 15Ca, respectively. Each of the collar portions extends outward from a midpoint of the outer surface of the ring. As illustrated in FIG. 12B, the outside diameters of the collar portions 15Aa and 15Ca extend up to a region surrounded by the elastic members 17 and substantially adjoin to the outer surfaces of the elastic members 17. The intermediate ring 15B includes a plurality of positioning holes 15e corresponding to the positioning holes 13e of the first flange 13 and the positioning holes 14e of the second flange 14 and a plurality of recesses 15f corresponding to the recesses 13f of the first flange 13 and the recesses 14f of the second flange 14.

When the first flange 13, the intermediate ring 15A, the intermediate ring 15B, the intermediate ring 15C, and the second flange 14 are sequentially stacked and are fixed with the positioning pins 41, the O-ring 16 is disposed between the undersurface of the first flange 13 and the top surface of the intermediate ring 15A, the O-ring 16 is disposed between the undersurface of the intermediate ring 15A and the top surface of the intermediate ring 15B, the O-ring 16 disposed between the undersurface of the intermediate ring 15B and the top surface of the intermediate ring 15C, and the O-ring 16 is disposed between the undersurface of the intermediate ring 15C and the top surface of the second flange 14. Each of the O-rings 16 is elastically compressed slightly into the positioning recess 36. Moreover, the 16 elastic members 17 are disposed between the undersurface of the first flange 13 and the top surface of the intermediate ring 15A and the 16 elastic members 17 are disposed between the top surface of the second flange 14 and the undersurface of the intermediate ring 15B. The elastic members 17 are positioned at the recesses 13f, 14f, and 15f of the first flange 13, the intermediate ring 15B, and the second flange 14, are slightly elastically compressed, and substantially adjoin to the collar portion 15Aa of the intermediate ring 15 and the collar portion 15Ca of the intermediate ring 15C. The O-rings 16 and the elastic members 17 are fixed with the positioning pins 41 and thus are integrated with the first flange 13, the intermediate ring 15A, the intermediate ring 15B, and the second flange 14.

In the case of the third modification, the intermediate ring 15A, the intermediate ring 15B, and the intermediate ring 15C are sequentially disposed with the interposed O-rings 16 between the first flange 13 and the second flange 14. The O-rings 16 are disposed in four stages. The elastic members 17 are disposed between the first flange 13 and the intermediate ring 15B and between the intermediate ring 15B and the second flange 14, forming a two-stage structure. Even if the intermediate ring 15 and the elastic members 17 have multistage structures, the vacuum-pump damper 12 can be obtained with a low profile. Furthermore, the number of intermediate rings between the first flange 13 and the second flange 14 is increased in multiple stages and thus damping of high-frequency oscillations can be further improved. Moreover, the collar portion 15Aa of the intermediate ring 15A and the collar portion 15Ca of the intermediate ring 15C substantially adjoin to the outer surfaces of the elastic members 17, so that vibration isolation is laterally obtained by the contact between the collar portions 15Aa and 15Ca and the elastic members 17 and the capability of lateral vibration isolation is improved.

Figure 13A:
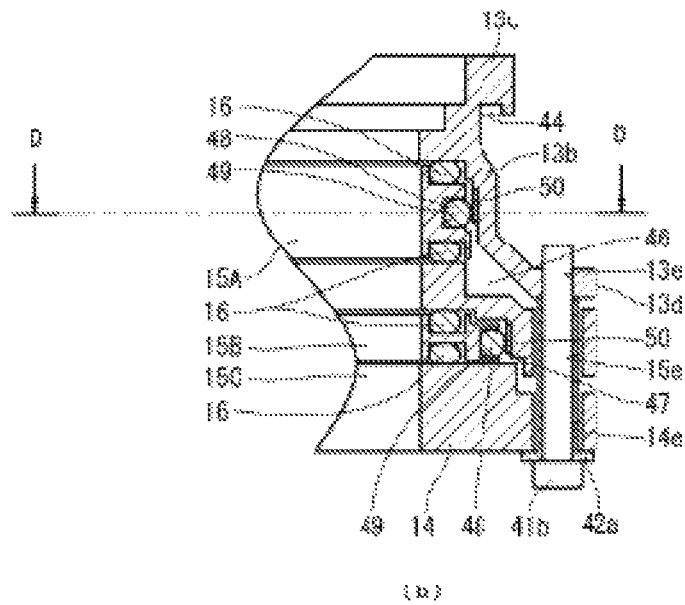
FIGS. 13A and 13B illustrate a fourth modification of the vacuum-pump damper of the present invention, FIG. 13A illustrating a part corresponding to a cross section taken along line A-A of FIG. 2, FIG. 13B illustrating a part corresponding to a cross section taken along line B-B of FIG. 2.
Figure 13B:
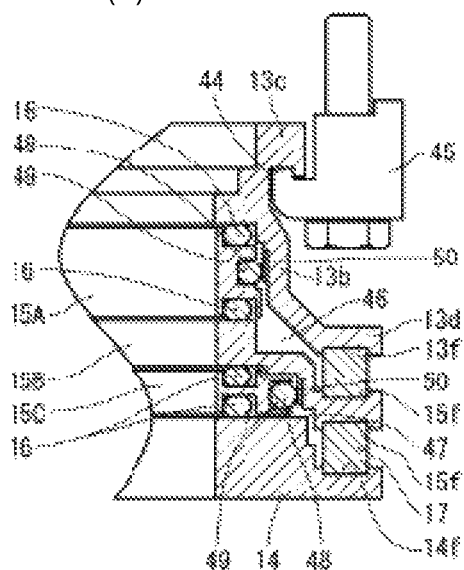

FIGS. 13A and 13B illustrate a fourth modification of the vacuum-pump damper of the present invention. FIG. 13A illustrates a part corresponding to a cross section taken along line A-A of FIG. 2. FIG. 13B illustrates a part corresponding to a cross section taken along line B-B of FIG. 2. In the fourth modification in FIGS. 13A and 13B, three intermediate rings, that is, an intermediate ring 15A, an intermediate ring 15B, and an intermediate ring 15C are sequentially stacked between the first flange 13 and the second flange 14.

The outside diameter of the upper flange part 13c of the first flange 13 is smaller than the outside diameter of the lower flange part 13d, and an engagement groove 44 is provided on the undersurface of the outer edge of the upper flange part 13c. When the vacuum-pump damper 12 and the vacuum chamber are fixed, the engagement groove 44 catches a claw 45a of an engagement hook 45 so as to fix the vacuum-pump damper 12 to the vacuum chamber.

Furthermore, the overall intermediate ring 15A is disposed in a space 46 of the flange body 13b in the first flange 13 and the intermediate ring 15B is also partially disposed in the space 46 of the flange body 13b. The outer edge of the intermediate ring 15B is bent downward substantially into an L-shape in cross section so as to form a space 47, in which the intermediate ring 15C can be stored, on the undersurface of the outer edge of the intermediate ring 15B, and then the intermediate ring 15C is placed in the space 47. Moreover, the recesses 15f for holding the columnar elastic members 17 are provided on the upper and lower sides of the outer edge of the intermediate ring 15B.

On each of the outer surface of the intermediate ring 15A and the outer surface of the intermediate ring 15C, a mounting groove 49 for mounting a second O-ring 48 is formed to surround each of the intermediate rings 15A and 15B. On the inner surface of the flange body 13b and the inner surface of the space 47 of the intermediate ring 15B, a plurality of small protrusions 50 vertically extending in substantially semicircular shapes in cross section are disposed at substantially equal intervals so as to correspond to the mounting grooves 49. The small protrusions 50 in contact with the second O-rings 48 prevent a lateral misalignment, keeping the stiffness of the second O-rings 48. Like the O-ring 16, the second O-ring 48 may be a composite member in which elastically deformable silicon rubber or the outer surface of the core 16a made of silicon rubber is coated and integrated with the fluorine dissimilar material 16b.

In the vacuum-pump damper 12 of the fourth modification, the first flange 13, the intermediate ring 15A, the intermediate ring 15B, the intermediate ring 15C, and the second flange 14 are sequentially stacked and are fixed with the positioning pins 41. At this point, the O-ring 16 is disposed between the undersurface of the first flange 13 and the top surface of the intermediate ring 15A, the O-ring 16 is disposed between the undersurface of the intermediate ring 15A and the top surface of the intermediate ring 15B, the O-ring 16 disposed between the undersurface of the intermediate ring 15B and the top surface of the intermediate ring 15C, and the O-ring 16 is disposed between the undersurface of the intermediate ring 15C and the top surface of the second flange 14. Each of the O-rings 16 is elastically compressed slightly into the positioning recess 36. In the mounting groove 49 formed on each of the outer surface of the intermediate ring 15A and the outer surface of the intermediate ring 15B, the second O-ring 48 are disposed in contact with the small protrusions 50. Moreover, the eight elastic members 17 are positioned between the undersurface of the first flange 13 and the top surface of the intermediate ring 15B and the eight elastic members 17 are positioned between the top surface of the intermediate ring 15B and the undersurface of the second flange 14 while being slightly elastically compressed.

Figure 14:
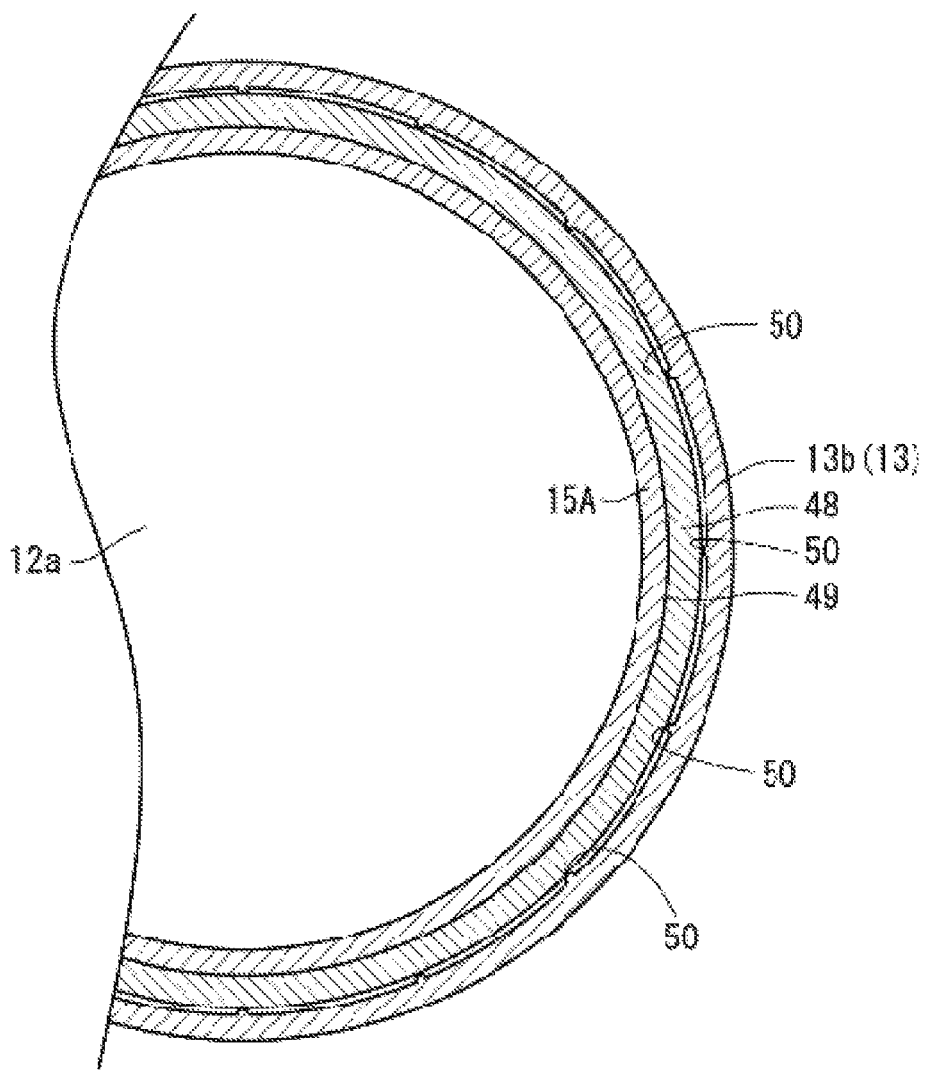
FIG. 14 is a cross-sectional view taken along line D-D of FIG. 13A.

The structure of the vacuum-pump damper 12 of the fourth modification is assembled such that the overall intermediate ring 15A and a part of the intermediate ring 15B are disposed in the space 46 of the flange body 13b and substantially the overall intermediate ring 15C is disposed in the space 47 of the intermediate ring 15B. Thus, the vacuum-pump damper 12 can be obtained with a low profile even if the O-rings 16 are disposed in multiple stages. As illustrated in FIGS. 13A, 13B, and 14, the second O-ring 48 in contact with the small protrusions 50 is disposed in the mounting groove 49 formed on each of the outer surface of the intermediate ring 15A and the outer surface of the intermediate ring 15B. Thus, the second O-ring 48 laterally obtains vibration isolation and improves the capability of lateral vibration isolation.

FIGS. 15A and 15B illustrate a fifth modification of the vacuum-pump damper of the present invention. FIG. 15A illustrates a part corresponding to a cross section taken along line A-A of FIG. 2. FIG. 15B illustrates a part corresponding to a cross section taken along line B-B of FIG. 2.

The fourth modification disclosed the structure in which three intermediate rings, that is, the intermediate ring 15A, the intermediate ring 15B, and the intermediate ring 15C are sequentially stacked between the first flange 13 and the second flange 14. In the fifth modification, only an intermediate ring 15D is used. The intermediate ring 15D is disposed in the space 46 of the flange body 13b in the first flange 13. On the outer surface of the intermediate ring 15D, the mounting groove 49 for mounting the second O-ring 48 is provided. The inner surface of the flange body 13b forming the space 46 is subjected to gear cutting to obtain the vertically extending small protrusions 50.

The first flange 13 and the second flange 14 are fixed by inserting the positioning pins 41 with the sleeves 42 from positioning holes 13g of the first flange 13 and screwing the external threads on the outer surfaces of the distal ends 41a of the positioning pins 41 into internal threads on the inner surfaces of positioning holes 14g of the second flange 14.

The intermediate ring 15D is disposed between the first flange 13 and the second flange 14. When the first flange 13 and the second flange 14 are fixed, the O-ring 16 is disposed in each of the positioning recesses 36 between the undersurface of the first flange 13 and the top surface of the intermediate ring 15D and between the undersurface of the intermediate ring 15D and the top surface of the second flange 14. Moreover, the second O-ring 48 is disposed in the mounting groove 49.

In the vacuum-pump damper 12 of the fifth modification, when the vacuum chamber is evacuated by the vacuum pump 10, the O-rings 16 and the elastic members 17 are elastically compressed by atmospheric pressures so as to reduce clearances among the first flange 13, the intermediate ring 15D, and the second flange 14 and a clearance, which is not illustrated, is created between the top surface of the first flange 13 and the collar portion 42a of the sleeve 42, so that the first flange 13 and the second flange 14 are electrically/mechanically insulated from each other.

Also in the structure of the vacuum-pump damper 12 of the fifth modification, the intermediate ring 15D placed in the space 46 of the flange body 13b is assembled. Thus, the vacuum-pump damper 12 can be obtained with a low profile. Furthermore, the second O-ring 48 in contact with the small protrusions 50 is disposed in the mounting groove 49 formed on the outer surface of the intermediate ring 15D. Thus, the second O-ring 48 laterally obtains vibration isolation and improves the capability of lateral vibration isolation.

The present invention can be modified in various ways without departing from the scope of the present invention. The present invention is naturally extended to the modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump for evacuating a vacuum chamber comprising:
   a first flange and a second flange, each having a central opening, the flanges being ring-shaped and disposed opposedly to each other;
   at least one intermediate ring, each of the at least one intermediate ring corresponding to the opening of the first flange and the opening of the second flange, having a central opening, and being disposed between the first flange and the second flange;
   O-rings, the O-rings being respectively disposed between the first flange and the at least one intermediate ring and between the at least one intermediate ring and the second flange;
   a plurality of elastic members, each of the plurality of elastic members being disposed such that the plurality of elastic members are circumferentially dispersed between the first flange and the at least one intermediate ring and circumferentially dispersed between the at least one intermediate ring and the second flange; and
   airtightness keeping means, the airtightness keeping means including positioning members, the positioning members being disposed so as to sequentially penetrate through positioning holes provided on the first flange, the at least one intermediate ring, and the second flange, wherein
   when the vacuum chamber is evacuated, the O-rings and the plurality of elastic members are compressed so as to reduce a clearance between the first flange and the second flange, and such that there is an empty space extending from a respective collar portion of each of the positioning members to an external surface of at least one of the second flange or and the first flange, wherein the external surface faces toward the collar portion of each of the positioning members.

2. The vacuum pump according to claim 1, wherein the elastic members are substantially cylindrical or prismatic.

3. The vacuum pump according to claim 1, wherein the O-rings are a composite members formed by coating an outer surface of a core made of silicon rubber with fluorocarbon rubber.

4. The vacuum pump according to claim 1, wherein the first flange and the second flange have recesses for positioning the O-rings and the elastic members at places in which the O-rings and the elastic members are disposed.

5. The vacuum pump according to claim 1, wherein from among a positioning recess for positioning the O-ring provided between the first flange and the at least one intermediate ring and a positioning recess for positioning the O-ring provided between the second flange and the at least one intermediate ring, one of the positioning recesses positions the respective O-ring such that a spring constant in an axial direction is smaller than a spring constant in a radial direction, and the other positioning recess positions the other respective O-ring such that a spring constant in the radial direction is smaller than a spring constant in the axial direction.

6. The vacuum pump according to claim 1, wherein one of the first flange and the second flange has mounting holes for mounting fixing screws for fixation to the vacuum chamber, and the at least one intermediate ring opposed to the mounting holes has notches for releasing heads of the fixing screws when the fixing screws are mounted, the notches being provided at a point corresponding to the mounting holes.

7. The vacuum pump according to claim 1, wherein the first flange includes:
   an annular part having an inner surface disposed over an outer surface of the at least one intermediate ring; and
   a flange part on which the elastic members and the positioning members are disposed, the flange part extending outward from one end face of the annular part.

8. The vacuum pump according to claim 1, wherein the at least one intermediate ring comprises multiple intermediate rings stacked in an axial direction of the first flange, the first flange partially includes an annular part having an inner surface disposed over outer surfaces of the intermediate rings, and
   the vacuum pump further comprises a second O-ring between the outer surface of the intermediate ring and the inner surface of the annular part.

9. The vacuum pump according to claim 1, wherein the at least one intermediate ring comprises a plurality of intermediate rings stacked in an axial direction of the first flange, wherein an upper intermediate ring of the plurality of intermediate rings partially includes an annular part having an inner surface disposed over an outer surface of a lower intermediate ring of the plurality of intermediate rings disposed under the upper intermediate ring, and
   the vacuum pump further comprises a second O-ring between the outer surface of the lower intermediate ring and the inner surface of the annular part.

10. The vacuum pump according to claim 8, wherein the inner surface of the annular part has a plurality of protrusions spread in a circumferential direction of the inner surface, the protrusions extending toward the second O-ring.

11. The vacuum pump according to claim 9, wherein the outer surface of the lower intermediate ring includes a collar portion extending outward from a part of the outer surface, and the elastic members are in contact with the outer surface of the collar portion of the lower intermediate ring.

12. A vacuum-pump damper for keeping airtightness between a vacuum chamber and a vacuum pump for evacuating the vacuum chamber,
   the vacuum-pump damper comprising:
   a first flange and a second flange, each having a central opening, the flanges being shaped like rings opposed to each other;
   an intermediate ring corresponding to the opening of the first flange and the opening of the second flange, having a central opening, and being disposed between the first flange and the second flange;
   O-rings, the O-rings being respectively disposed between the first flange and the intermediate ring and between the intermediate ring and the second flange;
   a plurality of elastic members circumferentially dispersed between the first flange and the intermediate ring and circumferentially dispersed between the intermediate ring and the second flange; and
   airtightness keeping means including positioning members inserted into positioning holes sequentially provided on the first flange, the intermediate ring, and the second flange, wherein
   when the vacuum chamber is evacuated, the O-rings and the plurality of elastic members are compressed so as to reduce a clearance between the first flange and the second flange, and such that there is an empty space extending from a respective collar portion of each of the positioning members to an external surface of at least one of the second flange or and the first flange, wherein the external surface faces toward the collar portion of each of the positioning members.

\* \* \* \* \*